(12) United States Patent    (10) Patent No.: US 12,646,243 B1

Fang et al.    (45) Date of Patent:    Jun. 2, 2026

(54) SEQUENTIAL RAY TRACING USING SURFACE SETS

(71) Applicant: Synopsys, Inc., Sunnyvale, CA (US)

(72) Inventors: Yong Fang, San Diego, CA (US); William J. Cassarly, Wooster, OH (US)

(73) Assignee: KEYSIGHT TECHNOLOGIES, INC., Santa Rosa, CA (US)

( * ) Notice: Subject to any disclaimer, the term of this patent is extended or adjusted under 35 U.S.C. 154(b) by 249 days.

(21) Appl. No.: 18/489,726

(22) Filed: Oct. 18, 2023

(51) Int. Cl.
     *G06T 15/06*      (2011.01)

(52) U.S. Cl.
     CPC ................................... *G06T 15/06* (2013.01)

(58) Field of Classification Search
     CPC ..................................................... G06T 15/06
     See application file for complete search history.

(56) References Cited

U.S. PATENT DOCUMENTS

2018/0239222 A1*   8/2018   Cahall ...................... G02B 9/04

* cited by examiner

*Primary Examiner* — Kevin K Pyo

(57) ABSTRACT

An optical system has a plurality of surfaces. In addition, a specification of a sequential ray trace through the optical system specifies an order of surface elements for tracing rays through the optical system. The sequential ray trace may be for stray light rays rather than for the primary rays propagating through the optical system. The surface elements include a surface set. The surface set includes at least two of the surfaces in the optical system. Rays are traced through the optical system according to the sequential ray trace. For example, the specification of the sequential ray trace may also specify a maximum number N of surface-intersections for the surface set. Rays are traced through the optical system with up to N surface-intersections with the surfaces in the surface set, and without regard to the order in which rays intersect the surfaces in the surface set.

20 Claims, 8 Drawing Sheets

Seq.Stray

| Order | Element | Hit # | Direction | Ray Type |
|---|---|---|---|---|
| 1 | S1 | 1 | Transmitted | Specular |
| 2 | Set.A | 9 | | |
| 3 | S6 | 1 | Transmitted | Specular |

Set.A

| Surface | Direction | Ray Type |
|---|---|---|
| S2 (Top) | TIR | Specular |
| S3 (Right) | TIR | Specular |
| S4 (Bottom) | TIR | Specular |
| S5 (Left) | TIR | Specular |

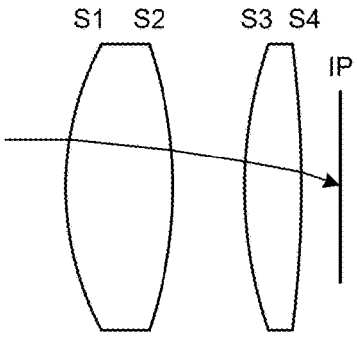

Seq.Main

| Order | Element | Direction | Ray Type |
|-------|---------|-----------|----------|
| 1 | S1 | Transmitted | Specular |
| 2 | S2 | Transmitted | Specular |
| 3 | S3 | Transmitted | Specular |
| 4 | S4 | Transmitted | Specular |

FIG. 1A

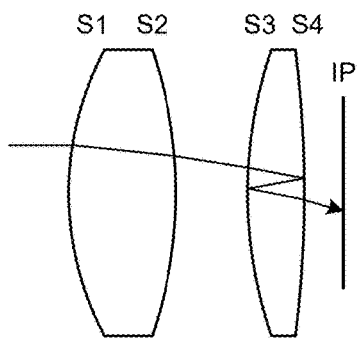

Seq.Stray1

| Order | Element | Direction | Ray Type |
|-------|---------|-----------|----------|
| 1 | S1 | Transmitted | Specular |
| 2 | S2 | Transmitted | Specular |
| 3 | S3 | Transmitted | Specular |
| 4 | S4 | Reflected | Specular |
| 5 | S3 | Reflected | Specular |
| 6 | S4 | Transmitted | Specular |

FIG. 1B

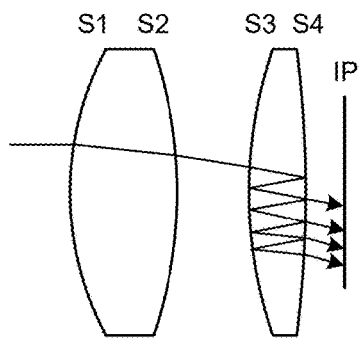

Seq.Stray2

| Order | Element | Hit # | Direction | Ray Type |
|-------|---------|-------|-----------|----------|
| 1 | S1 | 1 | Transmitted | Specular |
| 2 | S2 | 1 | Transmitted | Specular |
| 3 | S3 | 1 | Transmitted | Specular |
| 4 | Set.A | 8 | | |
| 5 | S4 | 1 | Transmitted | Specular |

Set.A

| Surface | Direction | Ray Type |
|---------|-----------|----------|
| S4 | Reflected | Specular |
| S3 | Reflected | Specular |

FIG. 1C

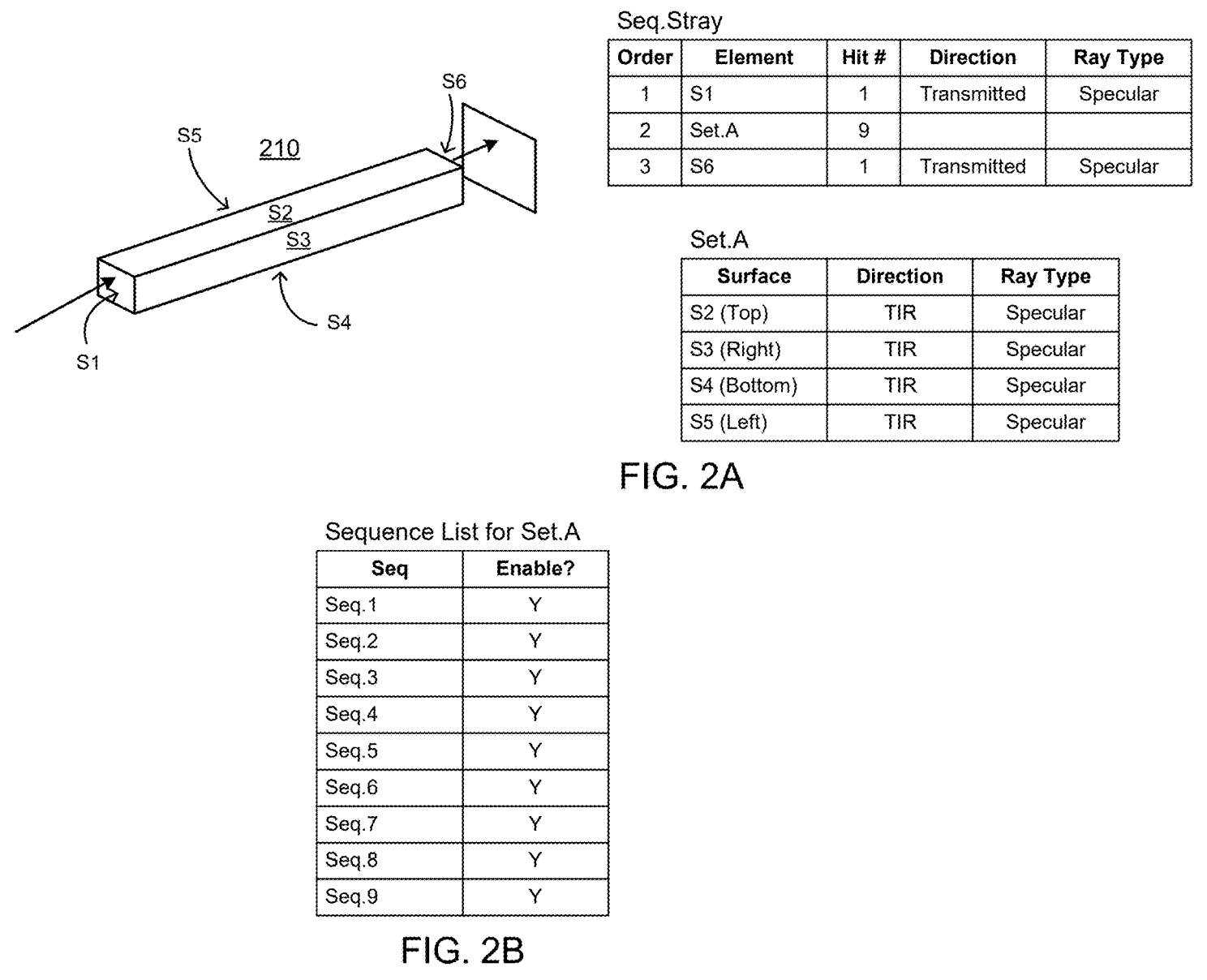

Seq.Stray

| Order | Element | Hit # | Direction | Ray Type |
|---|---|---|---|---|
| 1 | S1 | 1 | Transmitted | Specular |
| 2 | Set.A | 9 | | |
| 3 | S6 | 1 | Transmitted | Specular |

Set.A

| Surface | Direction | Ray Type |
|---|---|---|
| S2 (Top) | TIR | Specular |
| S3 (Right) | TIR | Specular |
| S4 (Bottom) | TIR | Specular |
| S5 (Left) | TIR | Specular |

FIG. 2A

Sequence List for Set.A

| Seq | Enable? |
|---|---|
| Seq.1 | Y |
| Seq.2 | Y |
| Seq.3 | Y |
| Seq.4 | Y |
| Seq.5 | Y |
| Seq.6 | Y |
| Seq.7 | Y |
| Seq.8 | Y |
| Seq.9 | Y |

FIG. 2B

Sequence List for System

| Seq | Enable? |
|-----|---------|
| Seq.Main | N |
| Seq.Stray1 | Y |
| Seq.Stray2 | Y |
| Seq.Stray3 | Y |
| Seq.Stray4 | Y |
| Seq.Stray5 | Y |
| Seq.Stray6 | Y |
| Seq.Stray7 | Y |
| Seq.Stray8 | Y |

SEQUENTIAL RAY TRACING USING SURFACE SETS

TECHNICAL FIELD

The present disclosure relates to ray tracing of optical systems, for example ray tracing of stray light rays.

BACKGROUND

Ray tracing is a method for analyzing designs of optical systems. In ray tracing, light propagation is modeled by tracing rays through an optical system, either in a forward direction from source to receiver or in the reverse direction. For example, in imaging systems, the source may be an object that is imaged by the system. The optical system may be a camera, telescope, microscope or other imaging system. The end target is the image plane or sensor, where an image of the object is desired. As another example, in illumination systems, the source may be a lamp. The optical system may include a reflector, the bulb design, and/or relay optics, in order to create a desired illumination pattern.

Ray tracing may be used to determine whether the optical system achieves its desired function. In imaging systems, rays that originate from the object should propagate through the optical system along some intended path and converge to form a clear image of the object. In illumination systems, rays that originate from the source should propagate through the optical system along some intended path to create the desired illumination pattern. For convenience, these rays will be referred to as primary rays and the intended path for these rays as the primary path or primary ray trace for the optical system.

Another type of analysis is stray light analysis. Stray light can be the result of rays that deviate from the primary path. For example, there may be some unintended reflection or scatter from a surface that is intended to be transmissive. Tracing rays along these unintended paths will provide information about the stray light in a system.

SUMMARY

In some aspects, an optical system has a plurality of surfaces. A specification of a sequential ray trace through the optical system specifies an order of surface elements for tracing rays through the optical system. The sequential ray trace may be for stray light rays rather than for the primary rays propagating through the optical system. The surface elements include a surface set. The surface set includes at least two of the surfaces in the optical system. Rays are traced through the optical system according to the sequential ray trace. For example, the specification of the sequential ray trace may also specify a maximum number N of surface-intersections for the surface set. Rays are traced through the optical system with up to N surface-intersections with the surfaces in the surface set, and without regard to the order in which rays intersect the surfaces in the surface set.

In other aspects, a user interface is configured for users to define surface sets and to define sequential ray traces through the optical system.

In yet other aspects, multiple sequential ray traces are defined for different stray light rays. The multiple sequential ray traces are traced in parallel. The sequential ray traces may also be automatically generated from a sequential ray trace for the primary rays propagating through the optical system.

In yet other aspects, ray interactions may be with interfaces other than just surfaces. Examples include ray tracing of scattering events and through gradient index devices.

Other aspects include components, devices, systems, improvements, methods, processes, applications, computer readable mediums, and other technologies related to any of the above.

BRIEF DESCRIPTION OF THE DRAWINGS

The disclosure will be understood more fully from the detailed description given below and from the accompanying figures of embodiments of the disclosure. The figures are used to provide knowledge and understanding of embodiments of the disclosure and do not limit the scope of the disclosure to these specific embodiments. Furthermore, the figures are not necessarily drawn to scale.

FIGS. 1A-1C shows various sequential ray traces, in accordance with some embodiments of the present disclosure.

FIG. 2A shows another sequential ray trace using a surface set, in accordance with some embodiments of the present disclosure.

FIG. 2B shows a user interface for selecting the number of surface-intersections active in a surface set, in accordance with some embodiments of the present disclosure.

DETAILED DESCRIPTION

Figures 3, 4:
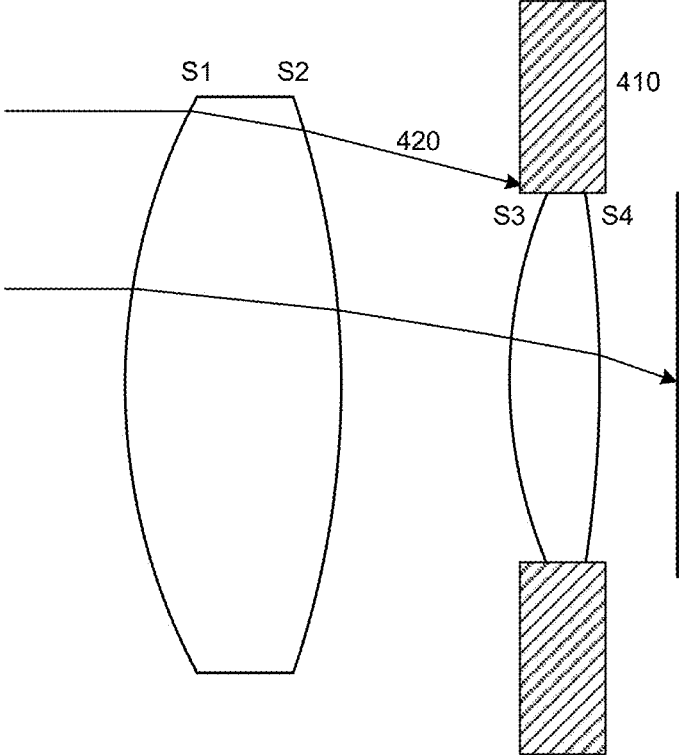
FIG. 3 shows a user interface for activating sequential ray traces, in accordance with some embodiments of the present disclosure.
FIG. 4 shows a ray blocked by an element of an optical system, in accordance with some embodiments of the present disclosure.

Aspects of the present disclosure relate to sequential ray tracing using surface sets, for example as may be used for stray light analysis. Stray light analysis is an important part of the design of many optical systems. Stray light is unwanted light in the system that does not contribute to the primary function of the system. It may be the result of unintended interactions with surfaces in the system, such as unintended scattering, diffusion, reflections or transmissions.

Monte Carlo ray tracing may be used to simulate how light passes through an optical system. When a ray intersects a surface, it transmits and/or reflects based on the surface's optical property. The ray may be split into transmitted and reflected rays. This splitting can be done by adding additional ray segments. One ray segment represents the transmitted ray and another ray segment represents the reflected ray. With splitting at each surface, the number of ray segments grows exponentially. In one approach, a power cut off threshold can be used to terminate most of the ray segments below a certain power to prevent excessive time and memory usage.

In another approach, the splitting can be done probabilistically. At each surface, the ray is split probabilistically based on the surface's transmission and reflection ratio. One out-going ray is generated for each input ray, based on the probability.

However, both of these approaches reduce the accuracy for low power areas of the stray light distribution: The power cutoff approach specifically removes the lower power ray segments that may be of most interest for stray light analysis. The probabilistic splitting approach results in a lower number of rays traced along the lower power paths. Accordingly, a large number of total rays must be traced in order to obtain a sufficient number of stray light rays to characterize the stray light distribution.

Instead of these approaches, stray light distribution may be simulated by defining sequential ray traces for stray light rays and then ray tracing the optical system according to the sequential ray traces. A sequential ray trace specifies an order of surface elements for tracing rays through the optical system. The surface elements may be individual surfaces in the optical system. They may also be surface sets.

A surface set is a set of two or more surfaces that is treated as a single surface element for purposes of the sequential ray trace. For example, if a sequential ray trace specifies surface X as element 3, surface set Y as element 4, and surface Z as element 5, then rays will be traced from surface X to surface set Y to surface Z. In one approach, the ray trace through surface set Y may intersect with any of the surfaces in the set, and in any order. The sequential ray trace may also specify a maximum number N of surface-intersections for the surface set. In that case, the ray trace may include up to N surface-intersections with the surfaces in the surface set. These concepts also apply to other types of interfaces in optical system, such as may be used to ray trace through volume scattering or through gradient index (GRIN) systems.

Technical advantages of the present disclosure include, but are not limited to, the following. The use of sequential ray traces specifies which ray traces are of interest, so that only rays that follow those paths need be traced. If stray light accounts for 0.1% of the total optical power, then 1000 rays are traced in a Monte Carlo simulation just to generate 1 stray light ray. The other 999 rays do not contribute to the stray light analysis. In contrast, if the sequential ray trace specifies a stray light path, then only 1 ray need be traced to generate 1 stray light ray. This saves processing power and memory space. It also reduces the simulation time.

The use of surface sets simplifies the enumeration of stray light paths. The primary path in an optical system is straightforward. If there are N surfaces, the primary path may be from surface 1 to surface 2 . . . to surface N. However, by definition, stray light rays may take many different paths. Rather than expressly defining every possible sequential ray trace for stray light rays, which would be a large number of sequential ray traces, surface sets may be used to define groups of related sequential ray traces. If this task is performed by the user, allowing the user to define surface sets instead of expressly listing all sequential ray traces reduces the time required to perform the task. It also reduces user errors.

FIGS. 1A-1C illustrate various sequential ray traces, in accordance with some embodiments of the present disclosure. In this example, the optical system includes two lenses with four surfaces labeled S1-S4. The lenses produce an image on a sensor, which is located at the Image Plane (IP). In each of these figures, the table on the right is the specification of the sequential ray trace, and the diagram on the left shows an example ray traced according to the sequential ray trace.

Each row of the table is a different surface element in the sequential ray trace. The columns are the following. "Order" shows the order of the sequential ray trace. "Element" identifies each surface element. Some elements are individual surfaces S1-S4 and others are surface sets Set.*. "Direction" indicates whether the ray is transmitted or reflected at the surface. In some cases, total internal reflection (TIR) may be included as an option. "Ray Type" indicates whether ray propagation at the surface is specular, near specular and/or diffuse. A ray can be split into multiple transmitted/reflected ray segments at a surface. The one with most of the power typically is the specular ray. The others are near specular (scattered) or diffuse (Lambertian scatter).

The tables shown in FIGS. 1A-1C show the specifications of sequential ray traces. They may be displayed in various formats to provide this information to the user. They may also be implemented as part of a user interface that allows users to define sequential ray traces. The user might fill in the table, for example by using free form text or from pull-down menus.

FIG. 1A shows a sequential ray trace Seq. Main for the primary ray trace of this optical system. The imaging function of the system is achieved by rays that are specularly transmitted through each of the four surfaces S1-S4 in that order. Surface element 1 is surface S1, surface element 2 is surface S2, and so on.

FIG. 1B shows a sequential ray trace Seq. Stray 1 for stray light rays. In this example, the stray light does not transmit through surface S4. Rather, it reflects off surface S4 (surface element 4 of the ray trace), returns to surface S3 and reflects off that surface (surface element 5 of the ray trace), and then transmits through surface S4 (surface element 6 of the ray trace).

The reflection off surface S4 and then surface S3 may occur any number of times, generating additional stray light rays. Each of these sequential ray traces may be expressly defined. FIG. 1B shows the express definition for one set of reflections. Alternatively, a surface set may be used to specify this group of sequential ray traces, as shown in FIG. 1C. The top table of FIG. 1C defines a sequential ray trace Seq. Stray2 that uses a surface set Set.A as surface element 4. Rays in this sequential ray trace are specularly transmitted through surface S3 (surface element 3 of the ray trace), propagate through surface set A (surface element 4), and then specularly transmit through surface S4 (surface element 5).

In the second table of FIG. 1C, surface set A is defined as including reflection off surface S4 and reflection off surface S3. In this example, the surface set A is also limited by an "Up to Hit" number in the column "Hit #", which is the maximum number of surface-intersections for the ray trace. Here, the "Up to Hit" number is 8, which accommodates up to 4 reflections off surfaces S4 and S3. The surface set is a more compact way to define this set of sequential ray traces. Ray traces with different numbers of surface-intersections are shown in the ray traces of FIG. 1C.

As demonstrated in FIG. 1C, a surface set is a collection of surfaces that are treated as a single surface element in the sequential ray trace. In the ray trace, a ray intersects with the surface set when it intersects with one of the surfaces. A typical optical system contains hundreds of different stray light paths. The use of surface sets can reduce the total number of the sequences that are specified to analyze the stray light.

FIG. 2A shows another example of a sequential ray trace using a surface set. In this example, a mixing rod 210 has a rectangular cross section with four side surfaces S2-S5: Top, Right, Bottom and Left. Rays reflect off these surfaces via total internal reflection, but different rays will reflect off the surfaces in different orders. They may also have a different number of reflections depending on the angle of incidence.

The sequential ray trace Seq. Stray specified in the top table includes a front surface S1 as surface element 2, a surface set A as surface element 3, and a back surface S6 as surface element 4. The front surface S1 is the entrance to the mixing rod and the back surface S6 is the exit from the mixing rod. The surface set A represents the sides of the mixing rod.

Rather than expressly listing all of the possible ray paths through the mixing rod, a surface set may be defined as shown in FIG. 2A. The surface set A includes the four surfaces S2-S5. The "Up to Hit" number is set to 9. This defines the maximum number of surface-intersections a ray can experience when propagating through this surface set. Rays with any number of surface-intersections that is less than or equal to the defined "Up to Hit" number are included in the sequential ray trace.

In some cases, the ray paths within the surface set may be further defined. FIG. 2B shows a user interface that permits the user to select how many surface-intersections are included in surface set A. The surface set is defined as including up to 9 surface-intersections. This set can be subdivided into a sequential ray trace Seq. 1 with exactly 1 surface-intersection, Seq.2 with 2 surface-intersections, and so on. The user may then decide which of these to activate for a particular analysis. For example, if the user is investigating light distributions associated with a certain number of reflections, they may check that number of hits in this window to limit the sequential ray trace to that subset of ray paths. The user may also have options to further specify the ray paths within a surface set, such as partially or wholly specifying the order of surfaces that are intersected.

For an optical system, sequential ray traces for stray light rays can be generated automatically based on the primary ray trace through the system and the surfaces' optical properties. Using the example of FIG. 1A, most of the light energy is transmitted along the primary ray trace: S1→S2→S3→S4.

However, a small percentage of energy/rays are reflected at each surface even with well coated lens surfaces. These reflected rays form the stray light distributions. After a ray is reflected by a surface, it can reach the sensor after being reflected again by a previous surface. These rays with two reflection events form the first order stray light. There are six possible combinations of two reflection events: S4→S3 (reflect off S4 and then off S3), S4→S2, S4→S1, S3→S2, S3→S1 and S2→S1. Here, intermediate surfaces have been omitted for clarity. Each of these corresponds to a sequential ray trace. For example, if the two reflections are at S3 and S1, then the sequential ray trace is S1→S2→S3→S2→S1→S2→S3→S4. These sequential ray traces may be generated automatically by creating these variations of the primary ray trace.

Second order stray light is the result of four reflections, and third order stray light is the result of six reflections. For a typical lens system, first and second order stray light sequences can account for 98% or more of the stray light. Third and higher order sequences are rarely needed.

All of the possible sequential ray traces may be generated automatically. In addition, surface sets and the "Up to Hit" number can be used to further reduce the number of sequential ray traces. For a typical 10 surface lens system, if surfaces sets and "Up to Hit" are used, only a small number of sequential ray traces are sufficient to model the dominant ghost stray light distributions.

In addition, based on the optical properties of the surfaces, some of the sequential ray traces may be pruned if their power content is too low. Note that the power threshold may be set much lower than in the case of Monte Carlo simulation.

Stray light sequences may also include total internal reflection (TIR) at any of the surfaces. In other situations, stray light may be generated by ray propagation that is near specular or diffuse, rather than specular. For example, in a lens system, the primary rays may be specularly transmitted through a surface according to Snell's law. Stray light may also be transmitted through the surface, but according to a near-specular or diffuse distribution.

Once the sequential ray traces are defined, the user may activate different traces. FIG. 3 shows a user interface window listing different sequential ray traces. Seq.Main is the primary ray trace through the optical system. Seq. Stray* are sequential ray traces for different stray light paths. The user may activate or deactivate different sequential ray traces by checking an Enable box.

The tracing of different rays and different sequential ray traces may be performed in parallel. Rather than separately tracing each ray for each sequential ray trace from source to end, a bundle of rays and sequential ray traces may be traced together. The rays may be split at surfaces according to the different sequential ray traces. For example, the primary ray trace S1→S2→S3→S4 and the stray light ray trace S1→S2→S3→S2→S1→S2→S3→S4 both start out by tracing S1→S2→S3. Therefore, these rays may be traced to surface S3 and then split. The transmitted ray segment is the primary ray, and the reflected ray segment is the stray light ray.

In one approach, the different possible interactions at a surface are considered, producing multiple outgoing ray segments. These ray segments are propagated to determine which surface element they intersect with next. If that surface element is consistent with one of the activated sequential ray traces, then the ray segment is kept and further propagated. Otherwise, it is discarded. In the above example, at surface S3, the ray may be split into different ray segments. If a reflected ray segment next intersects with surface S2, that is consistent with the sequential ray trace S1→S2→S3→S2→S1→S2→S3→S4 so that ray segment is kept. However, if the ray segment next intersects with surface S1, that does not correspond to any active sequential ray trace and that ray segment is discarded.

In addition, an optical system does not exist in a vacuum. It is surrounded by other elements. These surrounding elements may block rays and affect the stray light distribution. They may be considered during the sequential ray trace to analyze stray light accurately and to reduce the computational burden. A ray trace may be terminated if the ray intersects with a blocking element in the optical system. As shown in FIG. 4, the housing 410 of a lens surface blocks ray 420. This ray 420 is terminated and is not included in the stray light analysis.

Figure 5A:
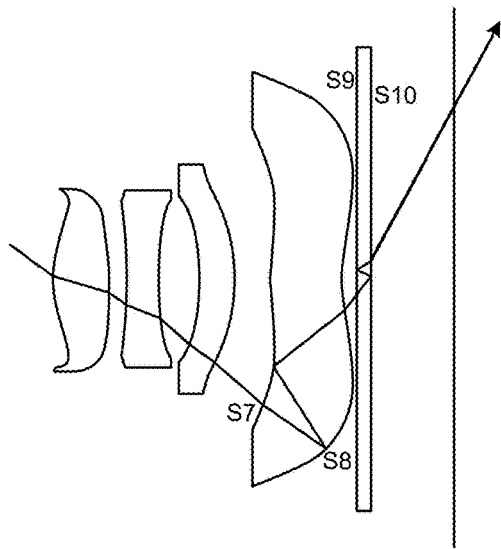
FIGS. 5A-5C show stray light analysis, comparing a Monte Carlo approach based on power cut off to an approach using sequential ray traces, in accordance with some embodiments of the present disclosure.
Figure 5B:
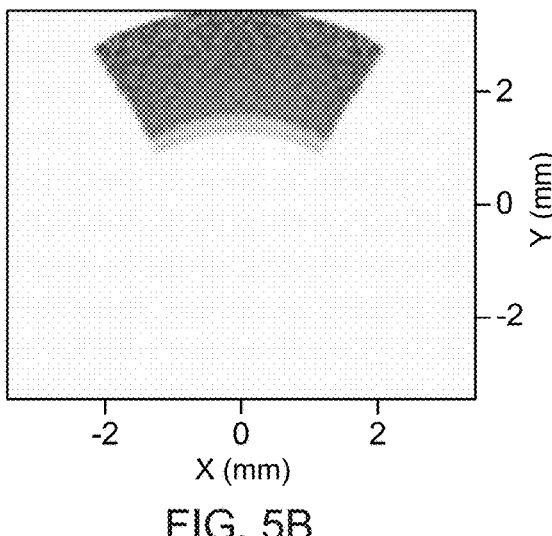
Figure 5C:
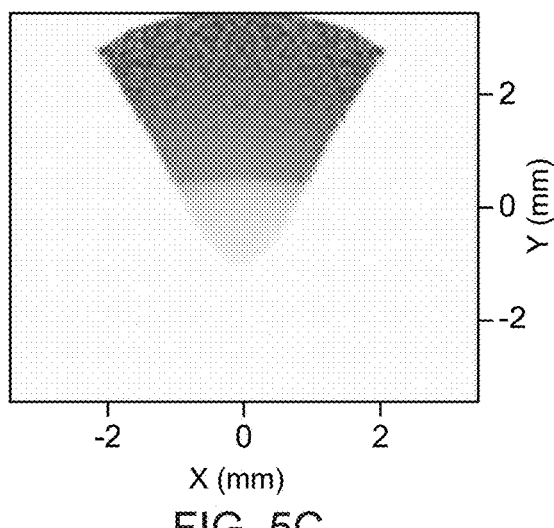

FIGS. 5A-5C show stray light analysis, comparing a Monte Carlo approach based on power cut off to an approach using sequential ray traces. FIG. 5A shows the optical system that is analyzed. The stray light reflects off surface S8 and then surface S7. There are also stray light reflections of surfaces S10 and S9. FIG. 5B shows the stray light prediction using a Monte Carlo approach based on power cut off. That is, rays below a certain power cut off threshold are terminated. A higher power cut off threshold is used for Monte Carlo ray tracing to prevent an exponentially growing number of ray segments and excessive usage of time and memory. However, since the low power ray segments are terminated, the stray light distribution in low power regions of the distribution, as shown in FIG. 5B, can be inaccurate.

FIG. 5C shows the more accurate result using sequential ray traces. The sequential ray trace approach can use a lower power cut off threshold (e.g., 1e-10 or smaller), since ray segments are terminated by their types and whether they intersect the next surface. Low power ray segments can therefore reach the sensor, and the stray light distribution shown in FIG. 5C is more complete than the Monte Carlo result of FIG. 5B.

Figure 6A:
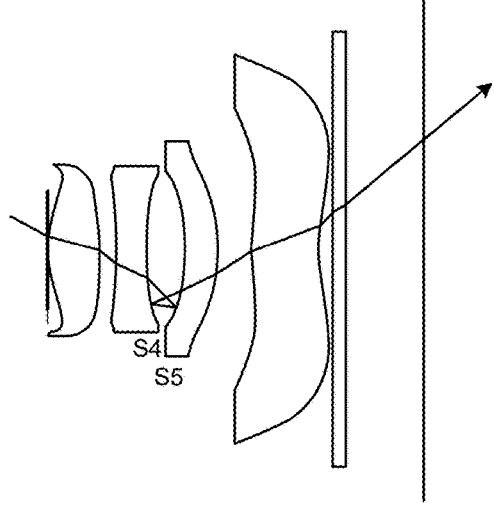
FIGS. 6A-6C show stray light analysis, comparing a Monte Carlo approach based on probabilistic splitting to an approach using sequential ray traces, in accordance with some embodiments of the present disclosure.
Figure 6B:
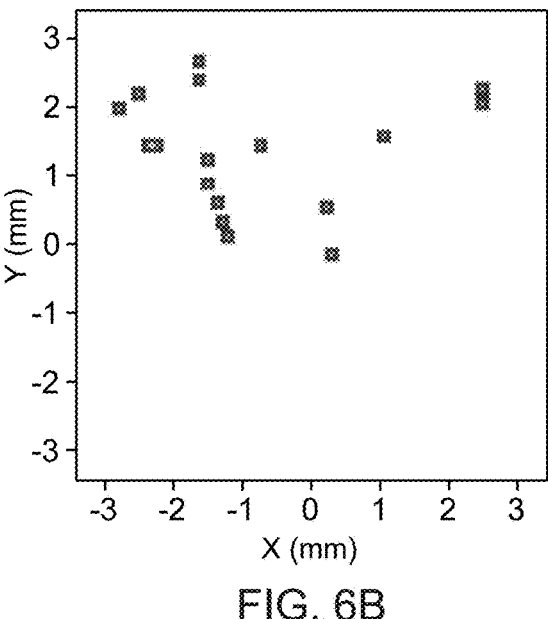
Figure 6C:
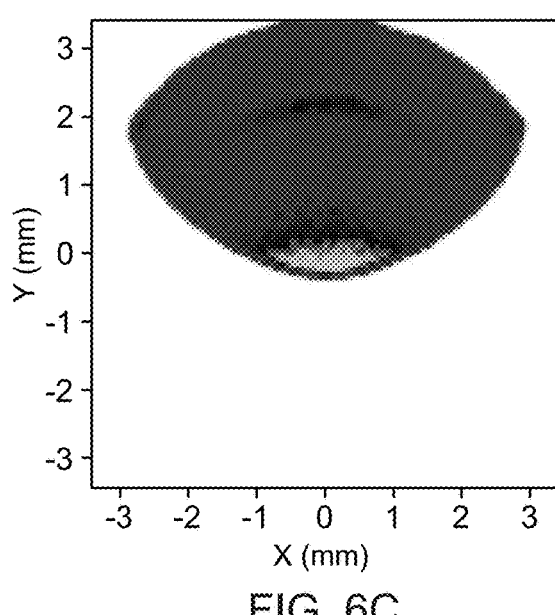

FIGS. 6A-6C show another example of stray light analysis, comparing a Monte Carlo approach based on probabilistic splitting to an approach using sequential ray traces. The stray light is first order stray light that reflects off surfaces S5 and then S4. FIG. 6B shows the stray light prediction using a Monte Carlo approach based on probabilistic splitting. That is, rays are reflected or transmitted at surfaces, based on the reflectivity and transmittivity of those surfaces. If a surface is 99% transmissive and 1% reflective, then the transmitted ray segment for an incident ray will be selected with 99% probability and the reflected ray segment selected with 1% probability. The resulting stray light distribution in FIG. 6B is noisy because not many stray light rays are selected. Based on the probabilistic splitting, most of the rays are primary rays rather than stray light rays.

FIG. 6C shows the more complete result using sequential ray traces. More stray light rays are traced because the sequential ray trace for the stray light is defined and any number of rays can be traced according to the sequential ray trace.

Figure 7:
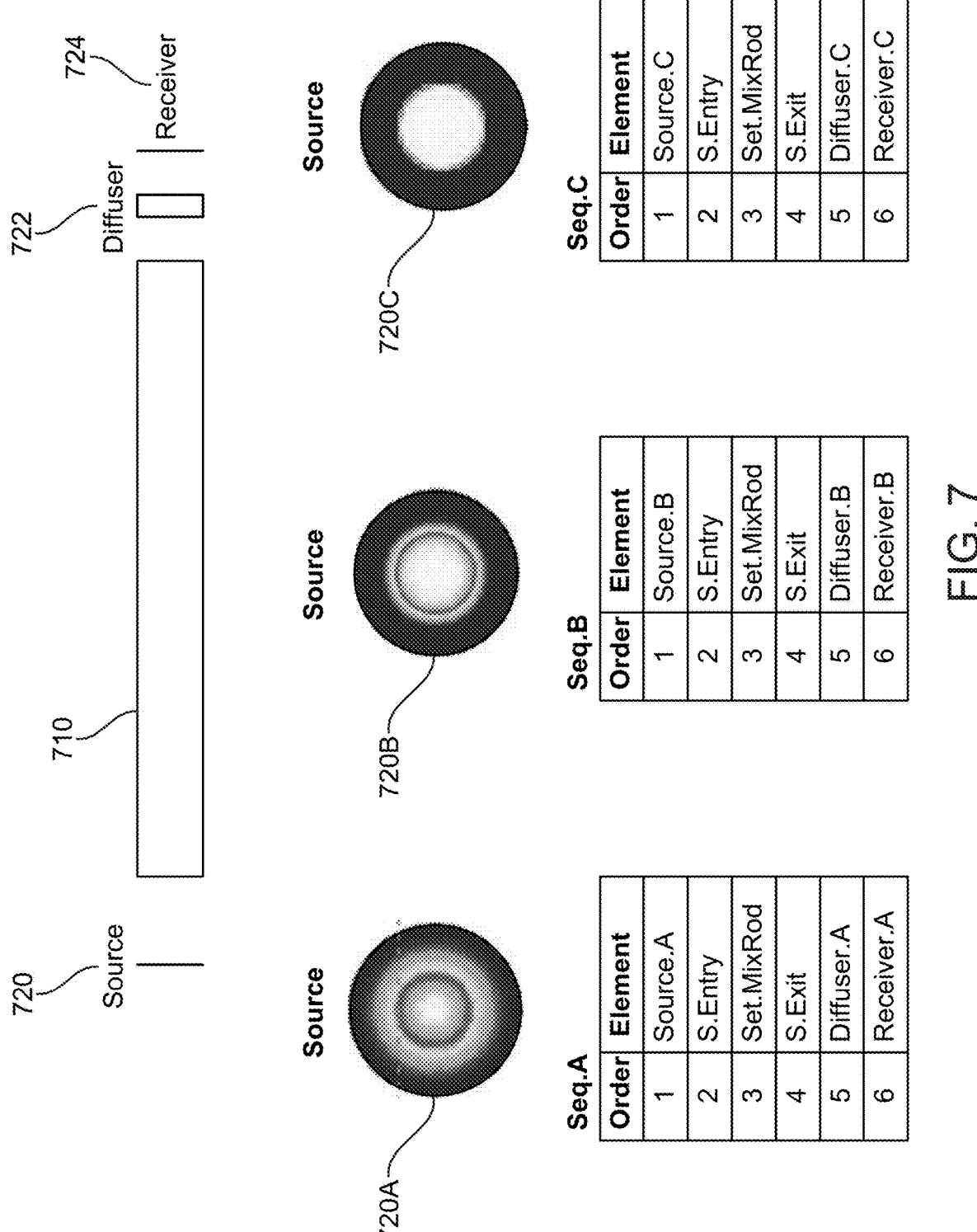
FIG. 7 shows sequential ray traces used to simulate a multi-configuration system, in accordance with some embodiments of the present disclosure.

Sequential ray traces and surface sets can also be used to model other situations, for example multi-configuration systems and time dependent sequences. FIG. 7 shows sequential ray traces used to design a multi-configuration system. In this example, a single mixing rod 710 may be used with different sources 720A-C. FIG. 7 shows a grayscale intensity distribution for each source. Each source is paired with a different diffuser 722A-C and receiver 724A-C. For example, this may be a single device but where the source, diffuser and receiver can be changed. Alternatively, this may be three different products but where the same mixing rod design is used for the three products.

In this example, a different sequential ray trace is defined for each of the three configurations: Seq.A, Seq.B and Seq.C. These sequential ray traces have the same surface elements 2-4 (the mixing rod), but the source, diffuser and receiver (elements 1, 5, 6) are different. The mixing rod is represented by a surface set Set. MixRod as described previously. This allows all three configurations to be designed together by tracing the different sequential ray traces. This sequential ray trace approach enables variables that are common to each configuration (e.g., the size and shape of the mixing rod) to be optimized using different merit functions for different sequential ray traces.

This example uses three different sources, with different ray traces originating from each source. In a further refinement, a single source is used, but the user specifies a splitting surface at the end of the mixing rod. This approach has an added benefit that the ray tracing through the mixing rod is the same for all three sequences.

Figure 8:
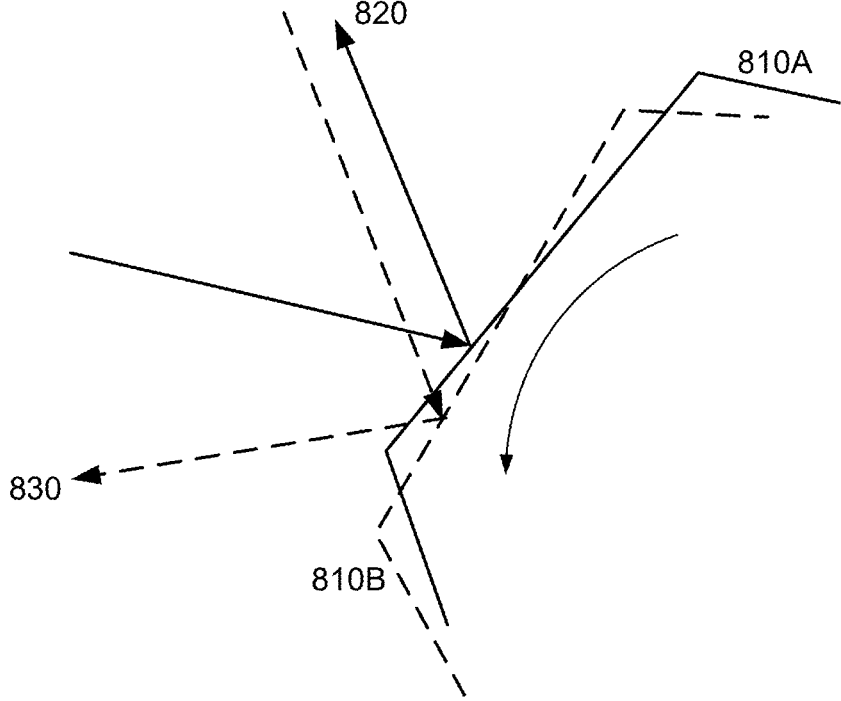
FIG. 8 shows sequential ray traces used to simulate a time-dependent system, in accordance with some embodiments of the present disclosure.

FIG. 8 shows the use of sequential ray traces for time-dependent systems. This example is a LiDAR system which uses a rotating scan mirror 810. An outgoing ray 820 from the LiDAR source is reflected off the mirror in position 810A to the external environment, as shown by the solid lines. The return ray 830 from the environment is again reflected off the mirror in position 810B to a detector, as shown by the dashed lines. The mirror rotation changes the position of the mirror between the time when the outgoing ray hits the mirror and the time when the return ray hits the mirror. This effect can be handled by sequential ray traces. The mirror at position 810A is one surface element, and the mirror rotated to position 810B is a later surface element. Surface sets could also be used if other elements, such as lenses, also interact with the rays.

The concept of surface sets may also be used with interfaces other than surfaces. These may be referred to as interface sets, which include a collection of interfaces. For example, in volume scattering, the ray trace can be a collection of scattering events. The ray enters the volume and hits multiple "particles." The ray interaction with a particle is an event. The equivalent to the surface set is a set of these events. The "Up to Hit" number defines the number of events that are included with the sequential ray trace of the volume scatter.

As another example, in gradient index materials, rays are traced through the material in small steps. The equivalent to the surface set is a set of these steps. The "Up to Hit" number defines the number of steps that are included with the sequential ray trace of the gradient index material.

Figure 9:
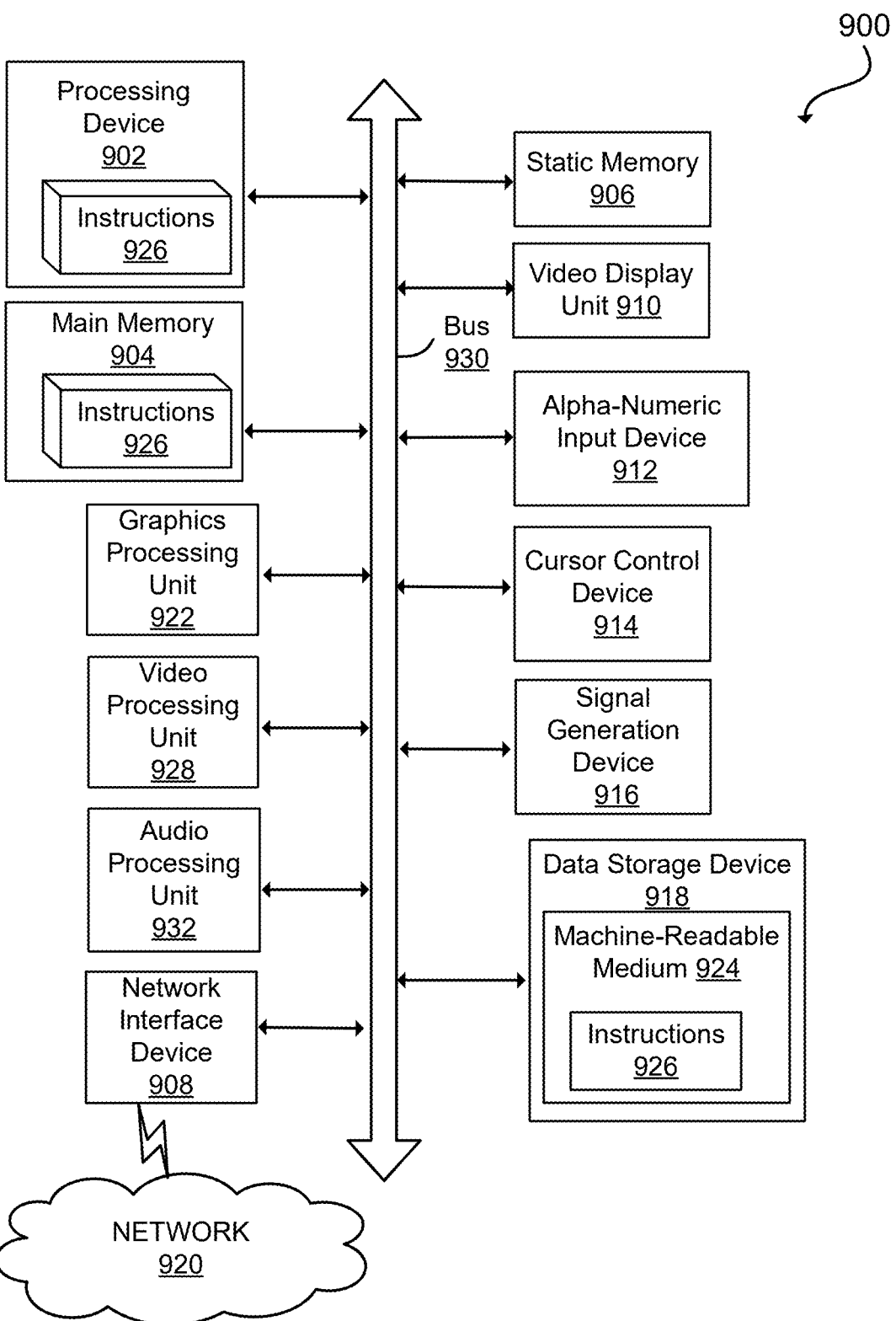
FIG. 9 depicts a diagram of an example computer system in which embodiments of the present disclosure may operate.

FIG. 9 illustrates an example machine of a computer system 900 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 900 includes a processing device 902, a main memory 904 (e.g., read-only memory (ROM), flash memory, dynamic random access memory (DRAM) such as synchronous DRAM (SDRAM), a static memory 906 (e.g., flash memory, static random access memory (SRAM), etc.), and a data storage device 918, which communicate with each other via a bus 930.

Processing device 902 represents one or more processors such as a microprocessor, a central processing unit, or the like. More particularly, the processing device may be complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 902 may also be one or more special-purpose processing devices such as an application specific integrated circuit (ASIC), a field programmable gate array (FPGA), a digital signal processor (DSP), network processor, or the like. The processing device 902 may be configured to execute instructions 926 for performing the operations and steps described herein.

The computer system 900 may further include a network interface device 908 to communicate over the network 920. The computer system 900 also may include a video display unit 910 (e.g., a liquid crystal display (LCD) or a cathode ray tube (CRT)), an alphanumeric input device 912 (e.g., a keyboard), a cursor control device 914 (e.g., a mouse), a graphics processing unit 922, a signal generation device 916 (e.g., a speaker), graphics processing unit 922, video processing unit 928, and audio processing unit 932.

The data storage device 918 may include a machine-readable storage medium 924 (also known as a non-transitory computer-readable medium) on which is stored one or more sets of instructions 926 or software embodying any one or more of the methodologies or functions described herein. The instructions 926 may also reside, completely or at least partially, within the main memory 904 and/or within the processing device 902 during execution thereof by the computer system 900, the main memory 904 and the processing device 902 also constituting machine-readable storage media.

In some implementations, the instructions 926 include instructions to implement functionality corresponding to the present disclosure. While the machine-readable storage medium 924 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine and the processing device 902 to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm may be a sequence of operations leading to a desired result. The operations are those requiring physical manipulations of physical quantities. Such quantities may take the form of electrical or magnetic signals capable of being stored, combined, compared, and otherwise manipulated. Such signals may be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may include a computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various other systems may be used with programs in accordance with the teachings herein, or it may prove convenient to construct a more specialized apparatus to perform the method. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. Where the disclosure refers to some elements in the singular tense, more than one element can be depicted in the figures and like elements are labeled with like numerals. The disclosure and drawings are, accordingly, to be regarded in an illustrative sense rather than a restrictive sense.

What is claimed is:

1. A method comprising:
   receiving a specification of a sequential ray trace through an optical system comprising a plurality of surfaces;
   wherein the specification specifies an order of surface elements for tracing rays through the optical system, and the surface elements include a surface set that includes at least two of the surfaces in the optical system; and tracing, by a processing device, rays through the optical system according to the sequential ray trace.

2. The method of claim 1, wherein the specification of the sequential ray trace also specifies a maximum number N of surface-intersections for the surface set, and tracing rays through the optical system comprises tracing rays with up to N surface-intersections with the surfaces in the surface set.

3. The method of claim 2, wherein the specification of the sequential ray trace permits rays intersecting with the surfaces in the surface set in any order.

4. The method of claim 2, wherein the specification of the sequential ray trace also constrains an order of the surfaces in the surface set with which the rays intersect.

5. The method of claim 1, wherein the optical system further includes one or more blocking elements, and tracing rays through the optical system further comprises:
    determining intersections of rays with the blocking elements, and terminating ray traces for rays that intersect with blocking elements.

6. The method of claim 1, wherein the sequential ray trace is for stray light rays and not for primary rays propagating through the optical system.

7. The method of claim 1, wherein the specification of the sequential ray trace further specifies whether rays are transmitted and/or reflected at surface-intersections.

8. The method of claim 1, wherein the specification of the sequential ray trace further specifies whether ray propagation at surface-intersections is specular, near specular and/or diffuse.

9. A system comprising:
    a processing device coupled to a memory storing instructions, wherein the instructions when executed cause the processing device to:
    trace rays through an optical system having a plurality of interfaces, according to a specification of a sequential ray trace; and
    provide a user interface configured for users to define sequential ray traces through the optical system, wherein each sequential ray trace specifies an order of interface elements for tracing rays through the optical system, the interface elements include interface sets that include at least two interfaces in the optical system, and the user interface is further configured for users to define interface sets.

10. The system of claim 9, wherein the user interface is further configured for users to specify, for the interface sets:
    which interfaces are included in the interface set; and
    a maximum number N of interface-intersections for the interface set.

11. The system of claim 9, wherein the user interface is further configured for users to activate and deactivate sequential ray traces, and the processing device traces rays according to the activated sequential ray traces.

12. The system of claim 9, wherein the user interface is further configured for users to automatically generate sequential ray traces for stray light rays from a sequential ray trace for primary rays propagating through the optical system.

13. The system of claim 12, wherein automatically generating sequential ray traces for stray light rays comprises:
    specifying that stray light rays are reflected from a surface element, when the primary rays are transmitted through the surface element.

14. The system of claim 12, wherein automatically generating sequential ray traces for stray light rays comprises:
    specifying that ray propagation at surface-intersections for stray light rays are near specular or diffuse, when the ray propagation at surface-intersections for primary rays is specular.

15. The system of claim 12, wherein the sequential ray traces for stray light rays have more surfaces than the sequential ray trace for primary rays.

16. A non-transitory computer readable medium comprising stored instructions, which when executed by a processing device, cause the processing device to:
    receive specifications of a plurality of sequential ray traces for stray light rays propagating through an optical system comprising a plurality of surfaces; wherein the specifications specify orders of surface elements for tracing the stray light rays through the optical system, and at least one of the surface elements includes a surface set that includes at least two surfaces in the optical system; and
    trace stray light rays through the optical system according to the sequential ray traces, wherein multiple sequential ray traces are traced in parallel.

17. The non-transitory computer readable medium of claim 16, wherein the instructions further cause the processing device to terminate a ray trace if the ray does not intersect with a next surface element specified by any of the sequential ray traces.

18. The non-transitory computer readable medium of claim 16, wherein the instructions further cause the processing device to terminate a ray trace if the ray intersects with a blocking element in the optical system.

19. The non-transitory computer readable medium of claim 16, wherein at least two of the sequential ray traces correspond to different physical configurations of the optical system.

20. The non-transitory computer readable medium of claim 16, wherein at least two of the sequential ray traces correspond to states of the optical system at different times.

* * * * *